United States Patent Office 3,759,865
Patented Sept. 18, 1973

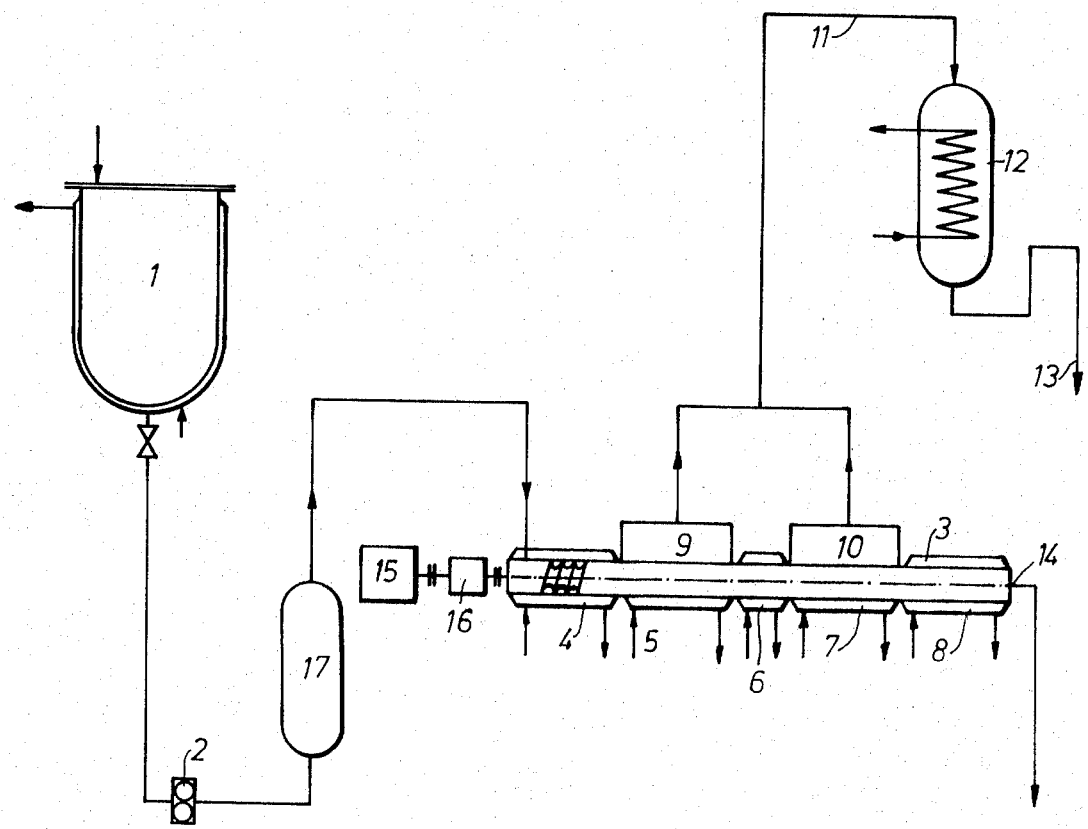

3,759,865
PROCESS FOR THE PRODUCTION OF
POLYCARBONATE SOLUTIONS
Gerhard Emmer, Hugo Vernaleken, Kurt Weirauch, and
Hermann Schnell, Krefeld, Germany, assignors to
Bayer Aktiengesellschaft, Leverkusen, Germany
Filed Jan. 28, 1971, Ser. No. 110,733
Claims priority, application Germany, Feb. 2, 1970,
P 20 04 517.4
Int. Cl. C08g 51/30
U.S. Cl. 260—33.8 R          13 Claims

ABSTRACT OF THE DISCLOSURE

A process for the production of a solution of a high molecular weight polycarbonate suitable for the production of filaments and films which comprises forming a solid solution of a polycarbonate with a molecular weight in excess of 30,000 by removing the solvent from a solution of the polycarbonate in a solvent at a temperature below its melting point under shear stressing, and redissolving the solid solution.

---

This invention relates to a process for the production of solutions of high molecular weight polycarbonates which are suitable for the production of filaments and films.

Polycarbonates based on aromatic dihydroxy compounds show off outstanding properties which make them suitable for use inter alia as starting materials for the production of films and filaments.

The mechanical properties and service properties of these polycarbonate films and filaments, which are advantageously produced by casting and wet spinning, are governed to a large extent by the degree of crystallinity which can be obtained after stretching the films of fibres.

In the case of polymers which contain polar groups, for example, and hence show a marked tendency towards crystallisation, for example, polyamides or polyethylene glycol terephthalate, there is no need to subject the starting materials for the films or fibres to any special pretreatment. These films and filaments show adequate service properties after stretching.

By contrast, many polymers, including polycarbonates, show no pronounced tendency towards crystallisation. Several measures have been taken with a view to improving their crystallisation behaviour. For example, crystallisation promoters can be added to the solution from which the films and filaments are obtained. Unfortunately, none of these methods is satisfactory.

It is an object of this invention to increase considerably the crystalline component in films and filaments of high molecular weight polycarbonates based on aromatic dihydroxy compounds, and hence the mechanical properties and service properties of these films and filaments, a special treatment of polycarbonate solutions used for the production of such films and filaments.

This object is accomplished by a process for the production of a solution of a high molecular weight polycarbonate suitable for the production of filaments and films which comprises forming a solid solution of a polycarbonate with a molecular weight in excess of 30,000 by removing the solvent from a solution of the polycarbonate in a solvent at a temperature below its melting point under shear stressing, and redissolving the solid solution. The removal of solvent is applied optionally after the addition of crystallisation nuclei.

The solvent content at which the "solid solution" state of the polycarbonate is obtained is governed by different parameters and has to be determined in each instance. The parameters include, for example, temperature, the type of solvent, and the type and also the molecular weight of the polycarbonate.

In the case of a polycarbonate obtained from 4,4'-dihydroxy 2,2-diphenyl propane, the upper limit to the solvent content is approximately 40% by weight for example, when methylene chloride is used as the solvent.

The shear energy can be transmitted to the polycarbonate, for example, continuously in a single-screw or multiple-screw extruder or similar machine. The shear energy has to be supplied to the polycarbonate solutions at a solids content of from 30 to 60%, by weight depending upon the chemical structure and molecular weight of the polycarbonate and also upon the solvent used. Gelation of the polycarbonate solution is initiated through the evaporation and shearing process. The temperature has to be such that the concentration range most favourable to crystallisation of from 20 to 60% by weight of solids is maintained for as long as possible, whilst at the same time fusion of the polycarbonates is avoided. The most favourable temperature is in the range from 60 to 200° C., depending upon the type of polycarbonate.

The residence time in the concentration range most favourable for transmitting the shear forces can be varied in the case of screw extruders, for example, by a variety of known measures, for example, by varying the screw geometry, the rotation speed and the filling level.

Suitable polycarbonates include those based on aromatic dihydroxy compounds, for example hydroquinone; resorcinol; 4,4'-dihydroxy-2,2-diphenylpropane; bis-(4-hydroxyphenyl)-alkanes, -cycloalkanes, -ethers, -sulphides, -sulphones, -ketones and bisphenols which are nuclear-halogenated; and a,a'-(bis-p-hydroxyphenyl)-p-diisopropyl benzene; and are obtained in known manner by reacting the bisphenol with a polycarbonate-forming derivative of carbonic acid. In order to obtain fibres and films of high quality, it is of advantage for the molecular weight to be above 30,000, and preferably above 50,000. Chlorinated aliphatic hydrocarbons or halogenated aromatic hydrocarbons, for example methylene chloride, chloroform, trichloroethane, chlorobenzene, or chlorotoluene, are used as the solvents.

By converting the polycarbonate solutions into solid solutions, accompanied by evaporation and the supply of mechanical energy, there is little or no need for recrystallisation promoters, for example, to be added to a spinning or film-forming solution of a polycarbonate thus obtained. After the solutions according to the invention have been converted into films and filaments, the treated polycarbonates show distinctly improved crystallinity and hence inter alia an increase in tensile strength, elongation and resistance to solvents. The high shear forces can readily be applied in a screw extruder or a machine operating in a similar manner, which is another advantage of the process according to the invention. In addition, the polycarbonate solutions can be simultaneously concentrated through evaporation in the machines. The evaporation process increases both the concentration and hence the viscosity of the solution, so that it is possible to transmit more shear energy.

The process which hitherto has been outlined in principle is explained in some detail in the following with reference to the accompanying drawing. The polycarbonate solution is pumped by means of a suitable pump, for example a gear pump 2, from a storage vessel 1 into a single-screw or multiple-screw extruder or into a similar machine.

A screw extruder 3 having two adjacent screws meshing with one another, is shown in the drawing. The screw can be heated and cooled in zone (4 to 8). The heat required to evaporate the solvent is delivered through the shaft in the form of mechanical work and/or directly in the form of heat through the heating zones 4, 5, 6 and/or 7. The required evaporation and shearing of the material takes place substantially in these zones. Some or all of the heat required for evaporation can also be delivered to the solution in a heat exchanger 17 upstream of the evaporator. The zone 8 can be cooled. It has a two-fold function, serving mainly to provide further size-reduction of the gelled polymer solution, and also serving to seal off a vapour dome 10 to some extent from a screw outlet 14. One important feature of the apparatus is that the screw outlet 14 has the same cross-section as the screw cylinder to prevent the product from melting through the build up of pressure and hence increase of temperature.

The gelled product passes from the outlet of the screw either into a storage container or into a machine in which the product is redissolved so that films or filaments can be prepared from the solutions.

The solvent vapours can be delivered through vapour domes 9 and 10 and through a vapour line 11 into a condenser 12 where they condense. The resulting condensate flows through a pipe 13 into a solvent tank, which is not shown in the drawing. Instead of the two vapour domes illustrated, it would also be possible to provide one correspondingly larger vapour dome or several correspondingly smaller vapour domes.

A slight reduced pressure is advantageously adjusted in the last dome before the outlet 14 in order to prevent the solvent from issuing from the apparatus. The screw is driven by a motor 15 through a gear system 16.

The following example is to further illustrate the invention without limiting it.

EXAMPLE

A polycarbonate based on 4,4′dihydroxy-2,2-diphenyl propane with a relative viscosity of $\eta_{rel}=2.05$ (measured in methylene chloride at 25° C. with c.=5 g./1000 ml.), corresponding to a molecular weight of approximately 100,000, is concentrated by evaporation in a twin-screw extruder with shear stressing. The screw diameter was 32 mm. its length was 1140 m., the thread pitch was 12 mm., the thread depth was 4 mm., the free cross-section in the vapour dome was 220 cm.$^2$ and the number of threads was 2. The rotational speed of the screw was 175 r.p.m. at a screw cylinder temperature of 100° C., 2.4 kg./hour of polycarbonate in the form of a 15% by weight solution in methylene chloride were concentrated by evaporation to a residual solvent content of less than 5% by weight. The mechanical energy transmitted for this purpose amounted to 0.19 kw. h. per kg. of polycarbonate. The product had a maximum temperature of 100° C. The solid polycarbonate solution was redissolved and cast into films. Crystallinity was determined through differential thermoanalysis and through X-ray defraction photographs.

The results are set out in the following table:

carbonates which are suitable for use in the production of films and filaments. Depending upon its residual solvent content, the solid solution of the polycarbonate is obtained in free-flowing flake or powder form so that there is no need for any milling before it is redissolved for further processing.

What we claim is:

1. A process for increasing the degree of crystallinity of polycarbonates comprising the steps of
   (A) subjecting a non-aqueous solvent solution containing a 30 to 60% by weight of polycarbonate having a molecular weight in excess of 30,000 to shearing stress at a temperature from 60 to 200° C. and below the melting point of the polycarbonate for a period of time and under conditions sufficient to effect an increase in the degree of crystallinity;
   (B) removing said non-aqueous solvent under the conditions of step A to obtain a solid solution consisting essentially of polycarbonate and said non-aqueous solvent, said solid solution being redissolvable without further milling; and
   (C) redissolving the solid solution of polycarbonate.

2. The process of claim 1, wherein crystallisation nuclei are added to the initial polycarbonate solution.

3. The process of claim 2, wherein the crystallisation nuclei comprise from 1 to 20% by weight, based on the initial polycarbonate solution, of a solid solution of said polycarbonate.

4. The process of claim 1, wherein said removing of solvent under shear stressing is carried out in a single-screw extruder.

5. The process of claim 1, wherein said removing of solvent and shear stressing are carried out in a multiple-screw extruder.

6. The process of claim 1, wherein said removing of solvent is carried out by evaporation.

7. The process of claim 6, wherein said evaporation is carried out under a pressure below 760 mm. Hg.

8. The process of claim 1, wherein said polycarbonate is based on 4,4′-dihydroxy-2,2-diphenyl propane.

9. The process of claim 1, wherein said polycarbonate is based on a dihydroxy compound selected from the group consisting of hydroquinone, resorcinol, a bis-(4-hydroxyphenyl)-alkane, -cycloalkane, -ether, -sulphide, -sulphone, -ketone and a nuclear-halogenated bisphenol.

10. The process of claim 1, wherein said solvent is a member selected from the group consisting of a chlorinated aliphatic hydrocarbon and a halogenated aromatic hydrocarbon.

11. The process of claim 1, wherein said non-aqueous solvent is chlorinated aliphatic hydrocarbon selected from the group consisting of methylene chloride, chloroform and trichloroethane.

12. The process of claim 1, wherein said non-aqueous solvent is halogenated aromatic hydrocarbon selected

TABLE

|  | Film thickness | | X-ray analysis | | Differential thermo-analysis: crystallinity from $\Delta Hs$,[1] percent | Strength of the stretched film, kp./mm.[2] | Elongation of the stretched film, percent |
| --- | --- | --- | --- | --- | --- | --- | --- |
|  | Unstretched, μm. | Stretched, μm. | Interference width, A. | crystallinity, percent |  |  |  |
| Polycarbonate treated by the process described in the foregoing | 60 | 15 | 0.95 | 19 | 14 | 25.4 | 30.9 |
|  | 48 | 12 | 0.95 | 17 |  | 24.2 | 29.8 |
|  | 40 | 10 | 1.0 | 16 |  | 24.4 | 42.8 |
|  | 20 | 5 | 1.0 | 16 |  | 21.6 | 25.4 |
| Polycarbonate untreated | 10 | (²) | 2.25 | 3 | <1 | (³) | (³) |
|  | 10 |  | 2.60 | 10 |  |  |  |
|  | 30 |  | 2.3 | 3 |  |  |  |

[1] $\Delta Hs$=melt enthalpy.
[2] Cannot be stretched.
[3] Indeterminable because the film cannot be stretched.

It is possible by virtue of the process described above continuously to produce solutions of crystallisable polycarbonates from the group consisting of chlorobenzene and chlorotoluene.

13. A process for increasing the degree of crystallinity of polycarbonates in solution comprising the steps of
(A) subjecting a solvent solution containing a 30 to 60% by weight of polycarbonate having a molecular weight in excess of 30,000 to shearing stress at a temperature from 60 to 200° C. and below the melting point of the polycarbonate for a period of time and under conditions sufficient to effect an increase in the degree of crystallinity;
(B) removing said solvent under the conditions of step A to obtain a solid solution of polycarbonate which is redissolvable without further milling; and
(C) redissolving the solid solution of polycarbonate.

References Cited
UNITED STATES PATENTS

| | | | |
|---|---|---|---|
| 3,379,801 | 4/1968 | Conix et al. | 260—47 X A |
| 3,505,273 | 4/1970 | Cleveland et al. | 260—33.8 |
| 3,535,280 | 10/1970 | Schnell et al. | 260—47 X A |
| 3,437,638 | 4/1969 | Bottenbrush et al. | 260—34.2 X |
| 3,453,184 | 7/1969 | Gemassmer et al. | 260—33.8 X |

LEWIS T. JACOBS, Primary Examiner

U.S. Cl. X.R.

260—34.2

UNITED STATES PATENT OFFICE
CERTIFICATE OF CORRECTION

PATENT NO. 3,759,065

DATED September 18, 1973

INVENTOR(S) Gerhard Emmer, et al

It is certified that error appears in the above-identified patent and that said Letters Patent are hereby corrected as shown below:

Column 4, line 33 of Claim 5, "and" should read ---under---.

Column 4, line 33 of Claim 5, "are" should read ---is---.

Signed and Sealed this

*eighteenth* Day of *November 1975*

[SEAL]

Attest:

RUTH C. MASON
*Attesting Officer*

C. MARSHALL DANN
*Commissioner of Patents and Trademarks*